United States Patent
Sato et al.

(10) Patent No.: US 6,499,508 B2
(45) Date of Patent: Dec. 31, 2002

(54) INSIDE/OUTSIDE AIR SWITCHING DEVICE WITH ROTARY DOOR

(75) Inventors: Yasuhiro Sato, Okazaki (JP); Tomohiro Kameda, Kariya (JP)

(73) Assignee: Denso Corporation, Kariya (JP)

( * ) Notice: Subject to any disclaimer, the term of this patent is extended or adjusted under 35 U.S.C. 154(b) by 35 days.

(21) Appl. No.: 09/891,975

(22) Filed: Jun. 26, 2001

(65) Prior Publication Data

US 2002/0000254 A1 Jan. 3, 2002

(30) Foreign Application Priority Data

Jun. 29, 2000 (JP) ........................................ 2000-196546

(51) Int. Cl.[7] ............................................ F16K 11/072
(52) U.S. Cl. .................................. 137/625.45; 454/139
(58) Field of Search ........................ 137/625.4, 625.45; 454/69, 126, 139

(56) References Cited

U.S. PATENT DOCUMENTS

,926,115 A * 6/1909 Hallowell et al. ..... 137/624.45
5,720,657 A * 2/1998 Kamiya et al. .............. 454/121
6,428,409 B1 * 8/2002 Egami et al. ................ 454/139
6,435,960 B2 * 8/2002 Sato ........................... 454/139

FOREIGN PATENT DOCUMENTS

| JP | A-9-188124 | 7/1997 |
|----|-----------|--------|
| JP | A-11-91342 | 4/1999 |

* cited by examiner

Primary Examiner—John Fox
(74) Attorney, Agent, or Firm—Harness, Dickey & Pierce, PLC

(57) ABSTRACT

In an inside/outside air switching device, a rotary door includes a circumference wall provided at an upper side of a rotation shaft to extend in a rotation direction, both fan-like side plates connecting the circumference wall and the rotation shaft at both sides in an axial direction of the rotation shaft, a protrusion wall provided along an entire periphery of the circumference wall and the side plates to protrude to an outside of the rotary door, and a packing member provided at both surface sides of the protrusion wall. A clearance equal to or larger than a predetermined dimension is provided between the protrusion wall around a lower side of the rotation shaft and a seal surface of an inside/outside air switching box, for preventing a water storage.

7 Claims, 4 Drawing Sheets

＃ INSIDE/OUTSIDE AIR SWITCHING DEVICE WITH ROTARY DOOR

CROSS-REFERENCE TO RELATED APPLICATION

This application is related to Japanese Patent Application No. 2000-196546 filed on Jun. 29, 2000, the contents of which are hereby incorporated by reference.

BACKGROUND OF THE INVENTION

1. Field of the Invention

The present invention relates to an inside/outside air switching device using a rotary door. More particularly, the present invention relates to a structure for preventing a freeze lock of the rotary door due to rainwater introduced from an outside of the inside/outside air switching device.

2. Description of Related Art

In a conventional inside/outside air switching device of a vehicle air conditioner described in JP-A-9-188124, a rotary door 113 shown in FIG. 6 is used for opening and closing inside and outside air introduction ports. That is, as shown in FIG. 6, the rotary door 113 includes a rotation shaft 113c, a circumference wall 113a provided at an upper side of the rotation shaft 113c to extend in a rotational direction of the rotary door 113, both fan-like side plates 113b connecting the rotation shaft 113c and the circumference wall 113a at both sides in an axial direction of the rotation shaft 113c, and protrusion walls 113d, 113e protruding toward outside from outer peripheral portions of the circumference wall 113a and the side plates 113b. In addition, packing members 114, 115 are provided on face and back surfaces of the protrusion walls 113d, 113e, respectively.

However, in the rotary door 113, the rotation shaft 113c is provided at a lower side of the circumference wall 113a through the fan-like side plates 113b, and seal surfaces of an inside/outside air switching box are tilted downwardly toward the rotation shaft 113c to contact the packing member 115. Accordingly, rainwater introduced from the outside air introduction port readily stays between the seal surfaces of the inside/outside air switching box and lower parts of the packing member 115 proximate to the rotation shaft 113c. Thus, the rotary door 113 may be frozen in a cold season due to rainwater.

SUMMARY OF THE INVENTION

In view of the foregoing problems, it is an object of the present invention to provide an inside/outside air switching device with a rotary door, which prevents a freeze of the rotary door due to rainwater.

According to the present invention, in an inside/outside air switching device, a rotary door for selectively opening and closing an inside air introduction port and an outside air introduction port includes a rotation shaft disposed rotatably, a circumference wall provided at an upper side of the rotation shaft to extend in a rotation direction, both fan-like side plates connecting the circumference wall and the rotation shaft at both sides in an axial direction of the rotation shaft, a protrusion wall provided along an entire periphery of the circumference wall and the side plates to protrude an outside of the rotary door, and a packing member made of an elastic member, and provided at both surface sides of the protrusion wall. An inside/outside air switching case has seal surfaces provided around both the ports to contact the packing member, at least one of both the first and second ports has a circumference opening provided to opposite to the circumference wall, and the rotary door is disposed in the case to form a clearance between the protrusion wall around a lower side of the rotation shaft and the seal surface. In addition, the clearance has a size equal to or larger than a predetermined dimension for preventing a water storage in the clearance. Accordingly, it can prevent rainwater from staying in the clearance, and it can prevent a freeze of the rotary door due to rainwater.

The rotation shaft is disposed at the lowest position in the rotary door. In this case, rainwater introduced from the outside air introduction port readily stays in the clearance lower than the rotation shaft. However, in the present invention, the clearance has a size equal to or larger than the predetermined dimension, rainwater introduced into the clearance readily flows downwardly.

Preferably, the packing member is separated around the lower side of the rotation shaft, and the clearance is defined at least by the protrusion wall on the lower side of the rotation shaft and the seal surface. Therefore, regardless a rotation position of the rotary door, rainwater introduced from the outside air introduction port moves along the side plates and the seal surface, and it can accurately prevent rainwater from staying under the rotation shaft.

Preferably, the seal surface for defining the clearance has a taper portion tilted downwardly in the case, at a position around the lower side of the rotation shaft. Therefore, rainwater introduced into the clearance can be effectively discharged downwardly, and it can effectively prevent a freeze of the rotary door due to rainwater.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

Figure 1:
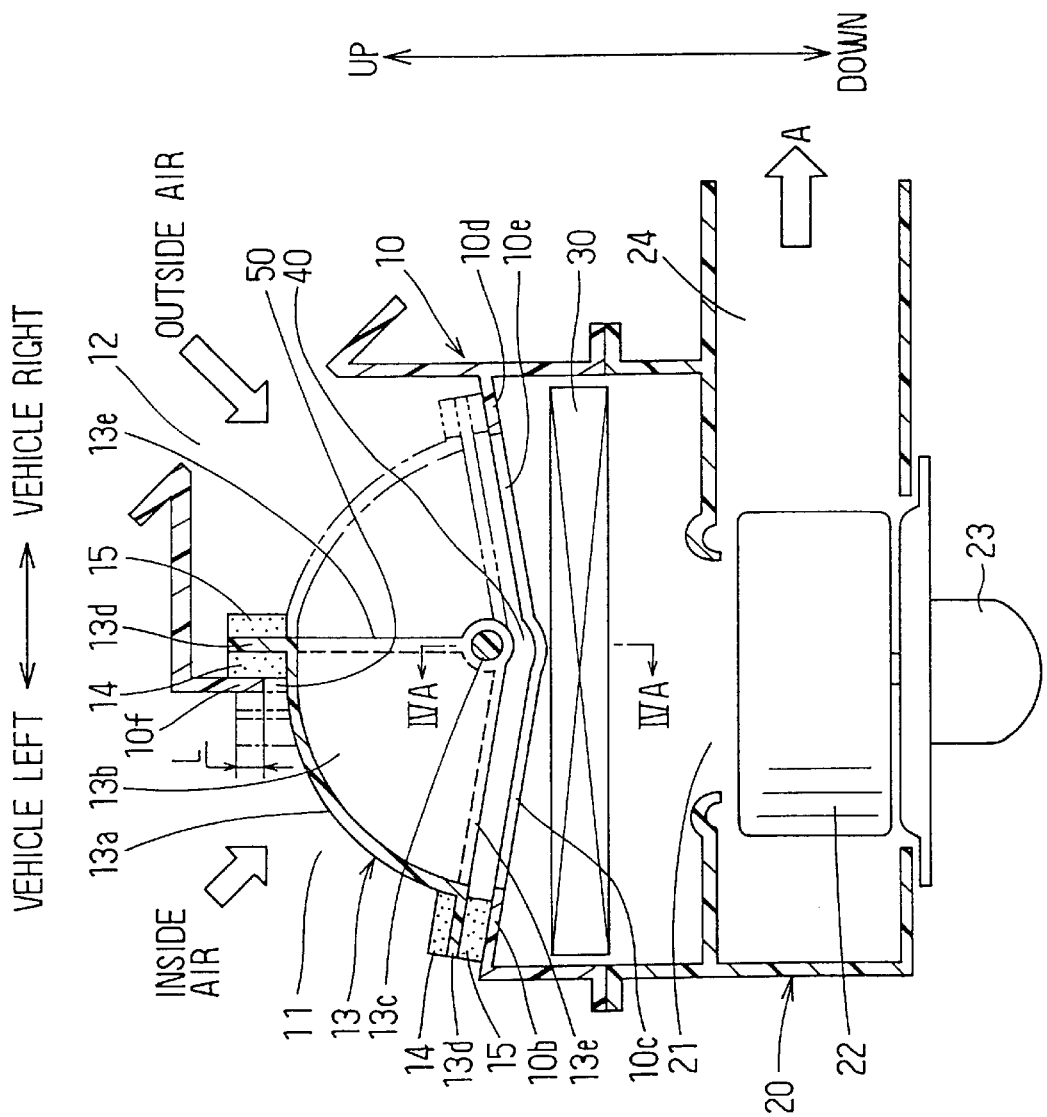
FIG. 1 is a schematic sectional view showing a blower unit including an inside/outside air switching device, according to a preferred embodiment of the present invention.

A preferred embodiment of the present invention will be described hereinafter with reference to FIGS. 1–5. FIG. 1 shows a blower unit including an inside/outside air switching device and a blower, disposed in a ventilation system of a vehicle air conditioner. Generally, the blower unit is disposed under an instrument panel at a front side in a passenger compartment of a vehicle on a front-passenger's side. An inside/outside air switching box (case) 10 made of a plastic resin defines an air passage of the inside/outside air switching device. A scroll casing 20 is disposed under the inside/outside air switching box 10 adjacent to the inside/outside air switching box 10, so that an inner side of the inside/outside air switching box 10 communicates with a bell-mouth like suction port 21 of the scroll casing 20.

The inside/outside air switching box 10 has an inside air introduction port 11 from which inside air inside the passenger compartment is introduced, and an outside air introduction port 12 from which outside air outside the passenger compartment is introduced. Within the inside/outside air switching box 10, a rotary door 13 is rotatably disposed to open and close the inside air introduction port 11 and the outside air introduction port 12.

Figure 2:
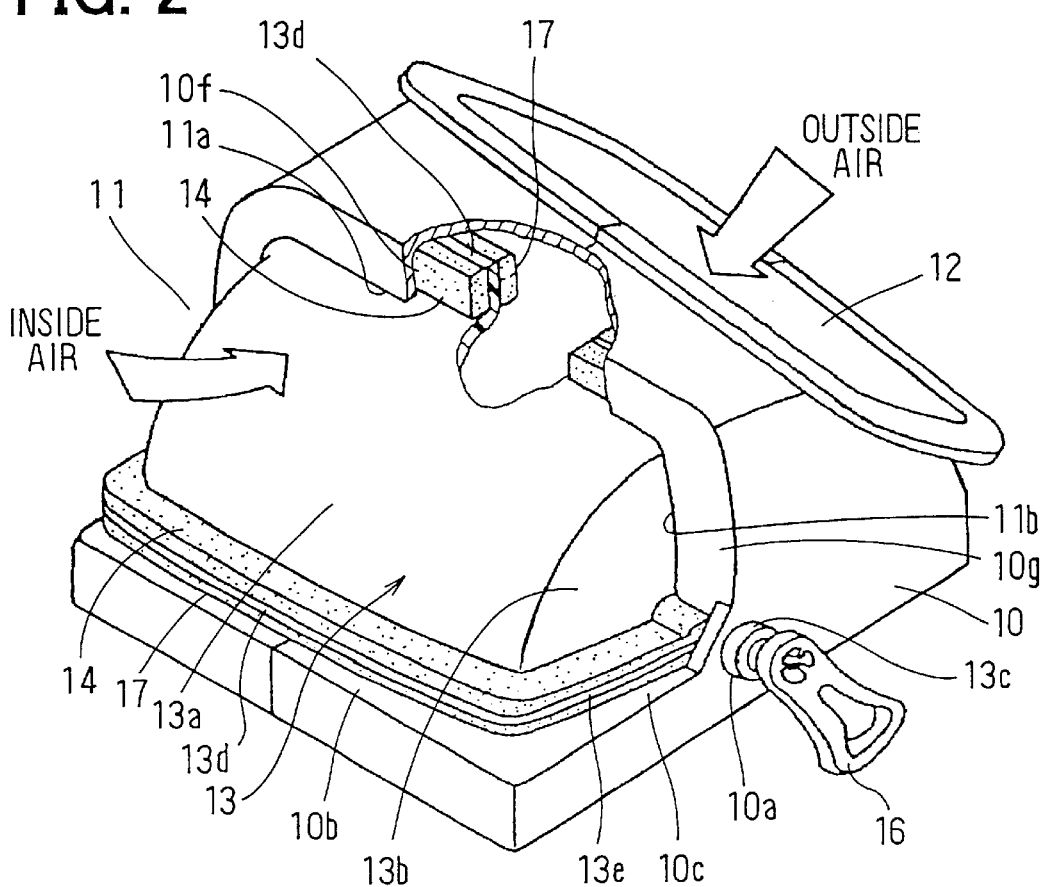
FIG. 2 is a partially-sectional perspective view showing the inside/outside air switching device of the embodiment.
Figure 3:
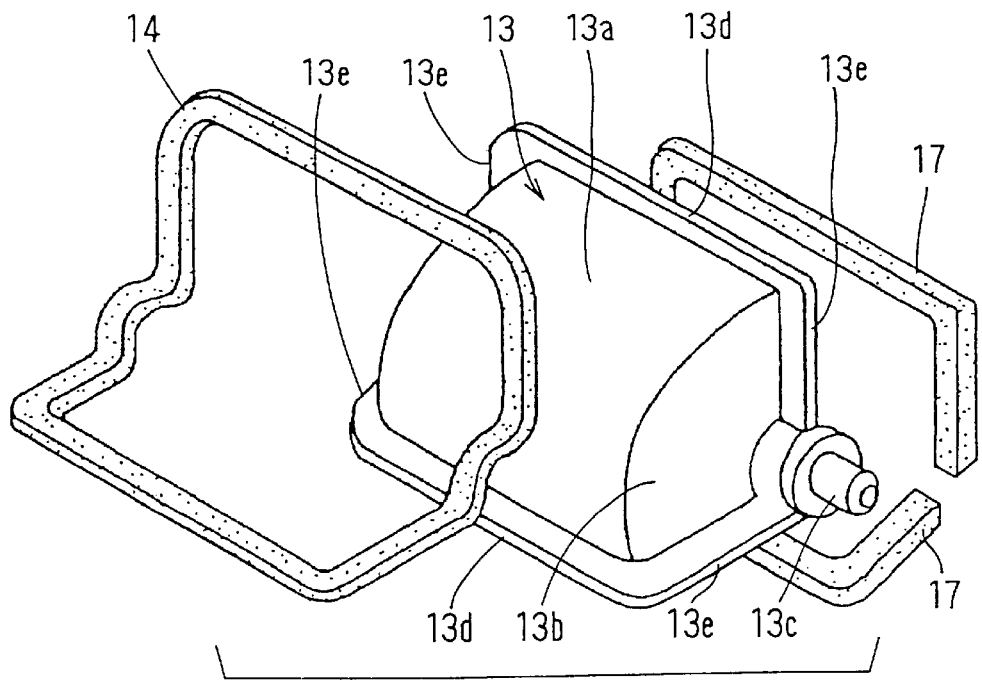
FIG. 3 is a disassemble perspective view showing a rotary door according to the embodiment.

As shown in FIGS. 2 and 3, the rotary door 13 has a circumference wall 13*a*, and a circumference angle of the circumference wall 13*a* is approximately 70°. Both side portions of the circumference wall 13*a* in an axial direction of a rotation shaft 13*c* are closed by both side plates 13*b*, respectively. The rotation shaft 13*c* is disposed at a center position of a radius of curvature of the circumference wall 13*a*, and both end parts of the rotation shaft 13*c* in the axial direction protrudes toward outside in the axial direction from the side plates 13*b*. The circumference wall 13*a* is positioned at an upper side of the rotation shaft 13*c*, and both the end parts of the rotation shaft 13*c* protruding toward outside in the axial direction are rotatably supported in bearing holes 10*a* (see FIG. 2) provided in the inside/outside air switching box 10.

Flange-like protrusion walls 13*d*, 13*e* are provided at periphery end parts of the circumference wall 13*a* and both the side plates 13*b*. Among the protrusion walls 13*d*, 13*e*, the protrusion wall 13*d* is placed at both ends of the circumference wall 13*a* in a circumference direction to protrude from both the ends of the circumference wall 13*a* radial outside. On the other hand, the protrusion wall 13*e* is provided to protrude from both periphery end parts of each side plate 13*b* toward outside in the axial direction.

The circumference wall 13*a*, both the side plates 13*b*, the rotation shaft 13*c* and the flange-like protrusion walls 13*d*, 13*e* of the rotary door 13 are integrally formed using a resin material such as polypropylene to be simply manufactured. As shown in FIG. 3, a packing member 14 is bonded to the protrusion walls 13*d*, 13*e* along an entire surface on a side of the circumference wall 13*a* using an adhesive or the like. On the other hand, a packing member 17 is bonded onto the other side surfaces of the protrusion walls 13*d*, 13*e* at a side of seal surfaces 10*b*, 10*c*, 10*d*, 10*e* of the inside/outside air switching box 10, using an adhesive or the like. The packing member 17 is separated from each other at portions corresponding to both end parts of the rotation shaft 13*c*, so that the packing member 17 is not bonded around a lower side of the rotation shaft 13*c*. That is, the packing member 17 is bonded to the seal surfaces 10*b*, 10*c*, 10*d*, 10*e* to form a first clearance 40 at a lower side of the rotation shaft 13*c*. The packing members 14, 17 are used as seal members for preventing an air leakage when the rotary door 13 closes the inside air introduction port 11 or the outside air introduction port 12. For example, the packing members 14, 17 are made of a porous elastic material such as urethane foam.

The inside air introduction port 11 is formed into a shape having a circumference opening 11*a* opposite to the circumference wall 13*a* of the rotary door 13, and a side opening 11*b* extending from the circumference opening 11*a* toward the rotation shaft 13*c*. That is, the inside air introduction port 11 is opened on the circumference side of the rotary door 13 and the side surface sides of the rotary door 13. Accordingly, in this embodiment, inside air can be introduced into the inside/outside air switching box 10 from the openings 11*a*, 11*b* of the inside air introduction port 11. On the other hand, the outside air introduction port 12 is constructed only by a circumference opening opposite to the circumference wall 13*a* of the rotary door 13.

In FIG. 1, the up-down direction and the right-left direction correspond to actual arrangement directions of the blower unit mounted on the vehicle. As shown in FIG. 1, the rotation shaft 13*c* of the rotary door 13 is disposed at an approximate center under lower sides of both the inside air introduction port 11 and the outside air introduction port 12 within the inside/outside air switching box 10. The seal surfaces 10*b*, 10*c* and the seal surfaces 10*d*, 10*e* are provided at both sides of the rotation shaft 13*c* to be tilted downwardly toward the rotation shaft 13*c*, and seal surfaces 10*f*, 10*g* are provided at upper side positions of the rotation shaft 13*c*.

The seal surfaces 10*b*–10*g* are provided in the inside/outside air switching box 10 so that the protrusion walls 13*d*, 13*e* of the rotary door 13 contacts (surface-contacts) the seal surfaces 10*b*–10*g* at a rotated position (i.e., the chain line position in FIG. 1) of an inside air introduction of the rotary door 13 and at a rotated position (i.e., the solid line position in FIG. 1) of an outside air introduction of the rotary door 13. In this embodiment, the seal surfaces 10*b*–10*g* are formed integrally with the inside/outside air switching box 10.

As shown in FIG. 2, a switching link member 16 made of resin is integrally connected to one side end of the rotation shaft 13*c* of the rotary door 13. For operating the rotary door 13, a manual operation force of an inside/outside air switching member (e.g., manual operation member) provided in an air-conditioning operation panel can be transmitted to the rotation shaft 13*c* from the switching link member 16 through a cable or the like. Alternatively, an electrical switch is operated by an inside/outside air switching operation member of an air-conditioning control panel to electrically operate an actuator (motor), and the rotary door 13 can be operated by the actuator through the switching link member 16 and the rotation shaft 13.

An air filter 30 for filtering dust contained in air and for removing a smelling component in air is disposed in the inside/outside air switching box 10 at a downstream air side of the rotation shaft 13*c* of the rotary door 13. The filter 30 is constructed by a filter material such as a wave-shaped filter paper and urethane foam, and a resinous frame. The air filter 30 is formed into a flat shape as shown in FIG. 1, and is disposed so that the rotation of the rotary door 13 is not affected by the air filter 30. The scroll casing 20 is made of a resin, and a blower fan 22 composed of a centrifugal multi-blade fan (sirocco) is disposed at a center position in a scroll shape of the scroll casing 20. That is, the fan 22 is disposed in the scroll casing 20 so that air sucked from a suction port 21 flows toward a radial outside of the fan 22 as shown by arrow A in FIG. 1 by the rotation of the fan 22. The fan 22 is connected to a rotation shaft of a driving motor 23 to be rotated.

At an outlet 24 of the scroll casing 20 in FIG. 1 is connected to a cooling unit and a heating unit (not shown) so that air is blown into the passenger compartment after being cooled, dehumidified and heated while passing through both the cooling and heating units.

Figure 4A:
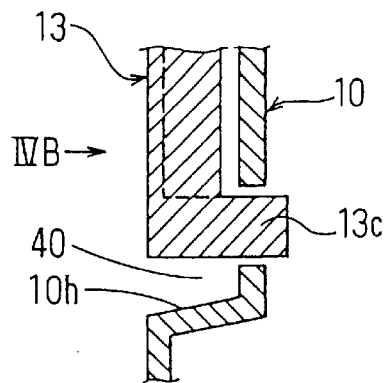
FIG. 4A is a cross-sectional view taken along line IVA—IVA in FIG. 1.
Figure 4B:
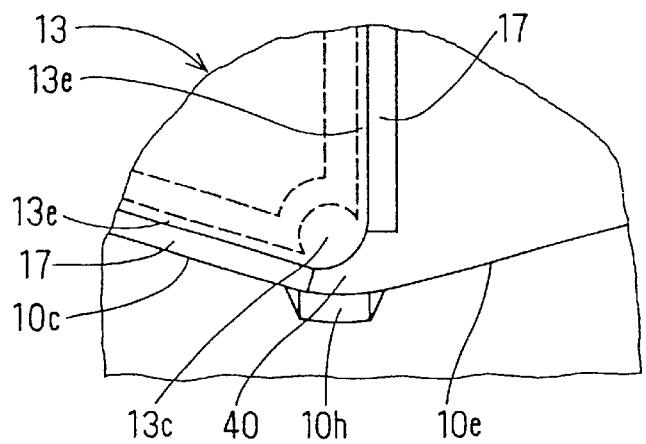
FIG. 4B is a side view when being viewed from arrow IVB in FIG. 4A.

Next, a main part of the present invention will de now described in detail. As shown in FIGS. 4A and 4B, the first clearance 40 is provided between the protrusion wall 13*e* at the lower side of the rotation shaft 13c and the seal surfaces 10c, 10e. For increasing the first clearance 40, the packing member 17 is not provided at the lower side part of the rotation shaft 13c to be away from the lower end of the rotation shaft 13c by a predetermined distance. Accordingly, the size of the first clearance portion 40 is increased by the thickness part of the packing member 17. In addition, a taper portion 10h tilted toward the lower side of the inside/outside air switching box 10 is provided in the seal surfaces 10c, 10e at a lower side part of the rotation shaft 13c. Thus, rain water introduced into the clearance 40 can be readily discharged downwardly through the taper portion 10h.

A second clearance portion 50 is provided between the circumference wall 13a and the circumference opening 10a when the rotary door 13 is rotated at a rotation position (the chain line position in FIG. 1) for introducing inside air. In this embodiment, while the seal surface 10f and the protrusion wall 13d are overlapped by an overlapped length L in the radial direction, the circumference wall 13a is provided at a lower side so that the second clearance 50 becomes larger. Accordingly, the second clearance portion 50 can be set to be equal to or larger than 5 mm. Thus, rain water does not stay in the second clearance portion 50, and flows downwatdly.

Next, operation of the inside/outside air switching device according to this embodiment will be now described. By rotating the rotary door 13 around the rotation shaft 13c, an inside air introduction mode or an outside air introduction mode can be selectively switched. When the outside air introduction mode is selected, the rotary door 13 is rotated at the solid line position of FIG. 1. In this case, the circumference wall 13a of the rotary door 13 closes the circumference opening 11a of the inside air introduction port 11, and both the side plates 13b of the rotary door 13 close both the side openings 11b of the inside air introduction port 11. On the other hand, in the outside air introduction mode, because the circumference wall 13a of the rotary door 13 is separated from the air passage of the outside air introduction port 12, the outside air introduction port 12 becomes in a fully opened state. Further, because the packing members 14, 17 attached to the protrusion walls 13d, 13e of the rotary door 13 press-contact the seal surfaces 10b, 10c, 10f, 10g of the inside/outside air switching box 10, an entire end surface of the rotary door 13 is sealed relative to the inside/outside air switching box 10.

In the outside air introduction mode, because the whole circular arc space within the rotary door 13 communicates with the outside air introduction port 12 and an upstream side of the air filter 30, outside air introduced from the outside air introduction port 12 flows through the passage beside the rotary door 13 and the passage inside the rotary door, and uniformly flows through an entire surface of the air filter 30, by the rotation of the blower fan 22. While outside air passes through the air filter 30, dust and selling components and the like contained in air can be removed and absorbed. Thereafter, outside air is sucked into the scroll casing 20 from the suction port 21, and is blown toward the cooling unit and the heating unit.

Next, when the inside air introduction mode is selected, the rotary door 13 is rotated from the solid line position in FIG. 1 in the clockwise direction by approximately 70°, and is moved to the chain line position in FIG. 1. In this case, the packing members 14, 17 attached to the protrusion walls 13d, 13e of the rotary door 13 press-contact the seal surfaces 10d, 10e, 10f, 10g of the rotary door 13, respectively, so that the entire peripheral end surface of the rotary door 13 is sealed relative to the seal surfaces 10d, 10e, 10f, 10g of the inside/outside air switching box 10.

According to the embodiment, the packing member 17 is disposed to be separated at the position proximate to the lower side of the rotation shaft 13c, and the taper portion 10h is provided in the seal surfaces 10c, 10e to be tilted downwardly within the inside/outside air switching box 10. Therefore, the first clearance portion 40 can be made larger regardless the rotation position of the rotary door 13. That is, the first clearance portion 40 has a size equal to or larger than a predetermined dimension for preventing a water storage. Further, because the packing member 17 is removed only at the lower side part of the rotation shaft 13c, it can prevent the sealing performance from being deteriorated, while the first clearance 40 having a dimension larger than the predetermined dimension is provided for preventing a storage of rainwater. Thus, in the present invention, it can prevent rainwater introduced from the outside air introduction port 12 from being stored in the lower side part of the rotation shaft 13c through the seal surfaces 10c, 10e tilted toward the rotation shaft 13c and through side plates 13b of the rotary door 13. Because rainwater can fall downwardly within the inside/outside air switching box 10, it can prevent a freezing of the rotary door 13 due to the rainwater in a cold season. Further, when the rotary door 13 is rotated to the rotation position of the inside air introduction mode, it can prevent rainwater introduced from the outside air introduction port 12 from being stayed between the circumference wall 13a and the circumference opening 11a by the surface tension of the rotary door 13, and it can prevent the rotary door 13 from freezing in the cold season. Rainwater introduced from the outside air introduction port 12 is discharged to an outside of the vehicle from a drain hole provided at a bottom end of the cooling unit.

Although the present invention has been fully described in connection with the preferred embodiment thereof with reference to the accompanying drawings, it is to be noted that various changes and modifications will become apparent to those skilled in the art.

Figure 5:
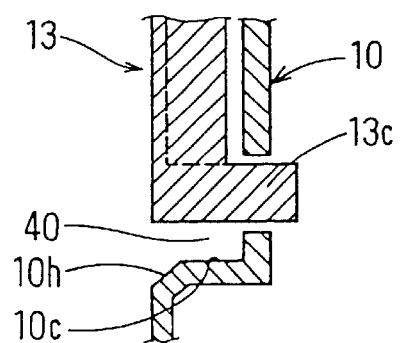
FIG. 5 is a cross-sectional view corresponding to FIG. 4A, showing a part of an inside/outside air switching device, around a lower part of a rotation shaft of a rotary door, according to a modification of the embodiment.
Figure 6:
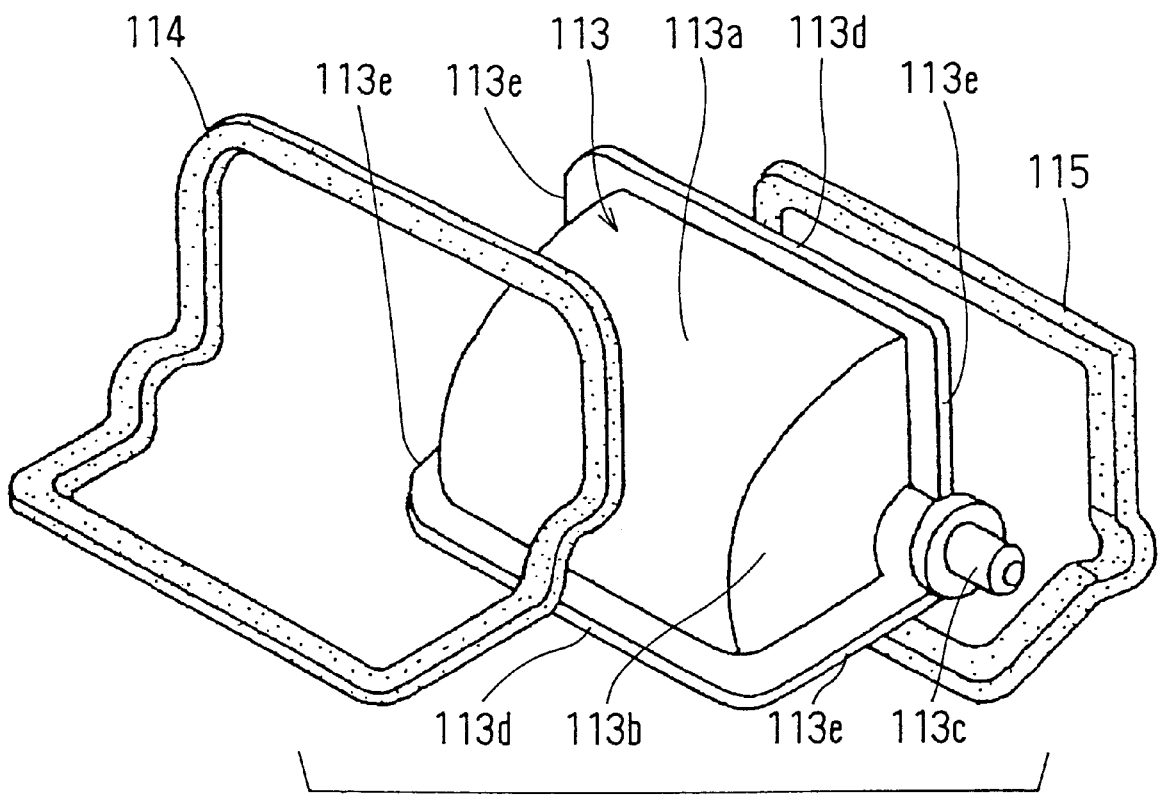
FIG. 6 is a disassemble perspective view showing a conventional rotary door.

For example, in the above-described embodiment, the taper portion 10h tilted downwardly within the inside/outside air switching box 10 is provided in the seal surfaces 10c, 10e at a lower side position around the rotation shaft 13c. However, as shown in FIG. 5, the taper portion 10h may be partially provided in the seal surfaces 10c, 10e, so that rainwater is not stored in the first clearance 40 but flows downwardly within the inside/outside air switching box 10.

In the above-described embodiment, the circular-arc circumference wall 13a is provided to extend in the rotation direction of the rotary door 13. However, the present invention may be applied to a rotary door having a step-like wall surfaces extending in the rotation direction of the rotary door 13. In the above-described embodiment, the air filter 30 is provided at the upstream air side of the suction port 21. However, the present invention may be applied to an inside/outside air switching device without the air filter.

Such changes and modifications are to be understood as being within the scope of the present invention as defined by the appended claims.

What is claimed is:

1. An inside/outside air switching device comprising:
   a case defining an air passage through which air flows, the case having a first port from which inside air inside a compartment is introduced, and a second port from which outside air outside the compartment is introduced; and
   a rotary door disposed in the case, for selectively opening and closing the first port and the second port, wherein:

the rotary door includes
- a rotation shaft disposed rotatably,
- a circumference wall provided at an upper side of the rotation shaft to extend in a rotation direction,
- both fan-like side plates connecting the circumference wall and the rotation shaft at both sides in an axial direction of the rotation shaft,
- a protrusion wall provided along an entire periphery of the circumference wall and the side plates to protrude toward an outside of the rotary door, and
- a packing member made of an elastic member, and provided at both surface sides of the protrusion wall;

the case has seal surfaces provided around both the first and second ports to contact the packing member;

at least one of both the first and second ports has a circumference opening provided to opposite to the circumference wall; and the rotary door is disposed in the case to form a clearance between the protrusion wall around a lower side of the rotation shaft and the seal surface, the clearance having a size equal to or larger than a predetermined dimension.

2. The inside/outside air switching device according to claim 1, wherein the rotation shaft is disposed at the lowest position in the rotary door.

3. The inside/outside air-switching device according to claim 1, wherein:

the packing member is separated around the lower side of the rotation shaft; and the clearance is defined at least by the protrusion wall on the lower side of the rotation shaft and the seal surface.

4. The inside/outside air switching device according to claim 1, wherein the seal surface for defining the clearance has a taper portion tilted downwardly in the case, at a position around the lower side of the rotation shaft.

5. The inside/outside air switching device according to claim 1, wherein the rotary door is disposed in the case, to form an another clearance having a dimension larger than a predetermined dimension between the circumference wall, and a wall part of the case, defining the circumference opening, in a radial direction of the rotary door.

6. The inside/outside air switching device according to claim 1, the predetermined dimension of the clearance is set for preventing a water storage in the clearance.

7. The inside/outside air switching device according to claim 1, wherein:

the packing member has a first packing part provided at an upper side surface of the protrusion wall, and a second packing part provided at a lower side surface of the protrusion wall;

the first packing part is disposed along the upper side surface of the protrusion wall; and the second packing part is disposed to be separated from the rotation shaft by a predetermined distance in a radial direction of the rotary door.

* * * * *